United States Patent [19]

Ogino

[11] Patent Number: 5,206,761
[45] Date of Patent: Apr. 27, 1993

[54] LARGE-SCREEN PROJECTION TYPE DISPLAY

[75] Inventor: Masanori Ogino, Yokohama, Japan

[73] Assignee: Hitachi, Ltd., Tokyo, Japan

[21] Appl. No.: 845,648

[22] Filed: Mar. 4, 1992

[30] Foreign Application Priority Data

Mar. 27, 1991 [JP] Japan ................................ 3-085853

[51] Int. Cl.$^5$ .............................................. G03B 21/60
[52] U.S. Cl. .................................................... 359/457
[58] Field of Search ............................ 359/455–457, 359/460; 353/77; 358/231, 237

[56] References Cited

U.S. PATENT DOCUMENTS

| Re. 33,795 | 1/1992 | Ogino | 353/74 |
|---|---|---|---|
| 4,536,056 | 8/1985 | Oguino | 350/128 |
| 4,636,035 | 1/1987 | Clausen et al. | 350/128 |
| 4,725,134 | 2/1988 | Ogino | 350/128 |
| 4,919,515 | 4/1990 | Hasegawa et al. | 350/128 |
| 4,919,518 | 4/1990 | Ogino et al. | 350/128 |
| 5,066,099 | 11/1991 | Yoshida et al. | 359/457 |
| 5,085,495 | 2/1992 | Iwahara et al. | 359/455 |

Primary Examiner—Richard A. Wintercorn
Attorney, Agent, or Firm—Antonelli, Terry, Stout & Kraus

[57] ABSTRACT

It is an object of the invention to provide a large-screen projection type display capable of reducing the moiré interference due to the periodical structure of the linear Fresnel lenses and lenticular lenses. Since the moiré interference is attributed to the shades S generated from the Fresnel sheet 1, these shades are diverged at a divergence angle ε by the action of the small-pitch lenticular lenses 4, so that the shades can be eliminated on the light-incident side surface of the lenticular sheet 3 which is located at a distance D from behind the Fresnel sheet.

30 Claims, 14 Drawing Sheets $W = \epsilon D$

48

49

50

F I G. 20
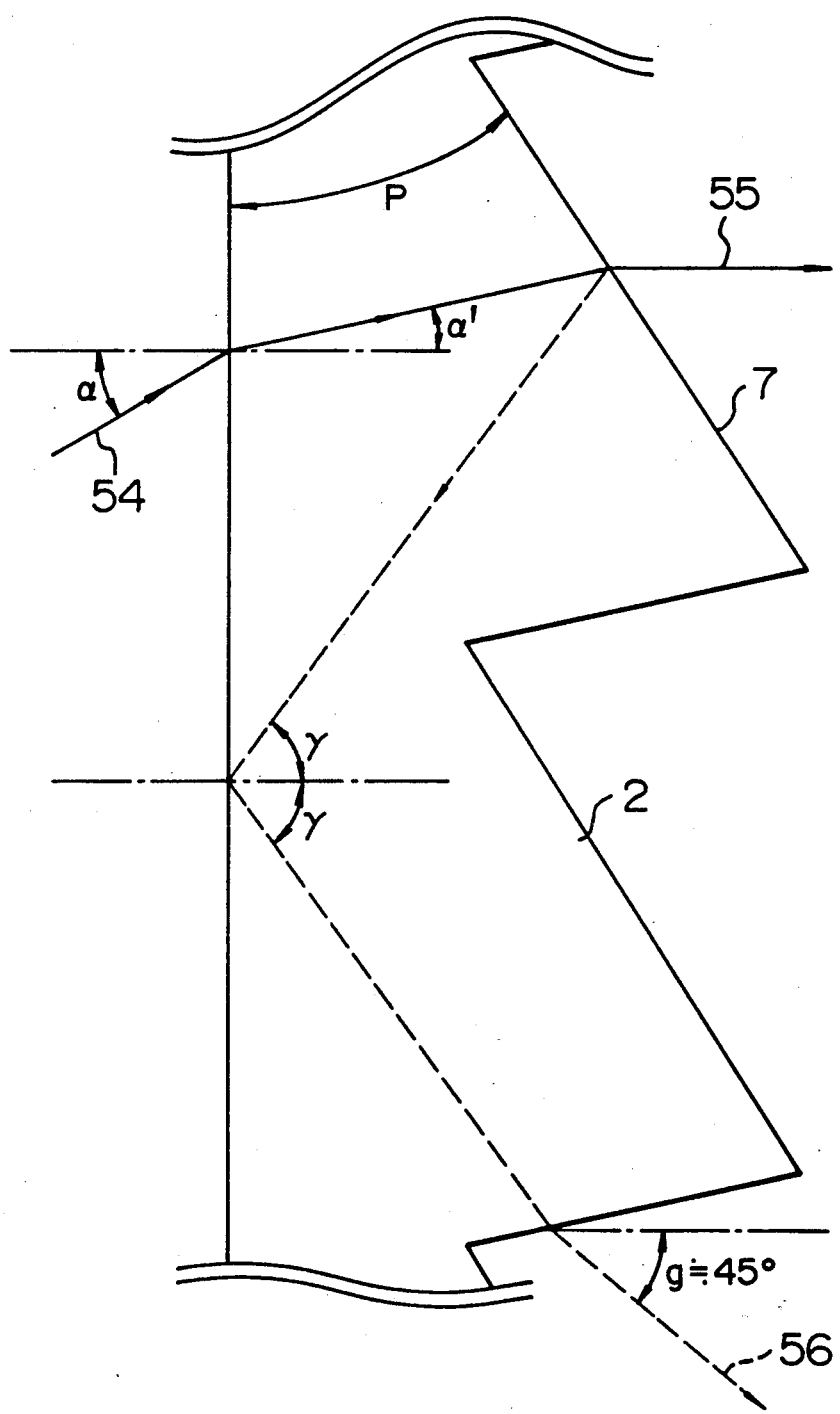

LARGE-SCREEN PROJECTION TYPE DISPLAY

BACKGROUND OF THE INVENTION

This invention relates to a rear projection type display of a large screen (for example, about 1.5 m to about 3 m in width), and particularly to the construction of a transmission-type screen therefor.

U.S. Pat. No. 4,536,056 "Rear Projection Apparatus" filed by this inventor discloses the construction of a transmission type screen lenticular lens suitable for the projection type display using a plurality of CRTs for projection. In this gazette, it is described that the elements constituting the screen may be either one of the circular Fresnel lens and the linear Fresnel lens.

In addition, U.S. Pat. No. 4,725,134 "Rear Projection Apparatus" filed by this inventor discloses means for preventing the moiré interference from occurring between the exiting surface type circular Fresnel lens and the lenticular lens.

At the present time, the screen based on the principle of both the gazettes given above has already been massproduced and contributed to the business world. However, the size of the screen is limited to about 1.4 m in the maximum width and about 1.1 m in height. This limitation is ascribed to the fact that the lenticular lens is produced on the basis of the extrusion roll molding process and that the effective lateral width of the extrusion roll molding machine is limited to about 1.4 m.

Moreover, the circular Fresnel lens, which is produced by casting molding or press molding, is difficult to produce with 1.4 m or above in width and with high performance.

Also, in the cross lenticular type screen without use of the Fresnel lens, a large number of lenticular lenses of about 1.2 m in width are joined together by bonding technique to produce a lens of 2 m or above in width which is practically used. However, the use of this cross lenticular type screen is limited to the projection system of a large projection distance (exactly speaking, projection distance/lateral width ratio) since it has no Fresnel lens element. Therefore, it is difficult to construct the projection type display of a short projection distance, or a small depth.

The transmission type screen using the liner Fresnel lens has not been put into practical use yet (at least, this inventor does not know any example of that screen).

SUMMARY OF THE INVENTION

It is an object of the invention to provide a technique capable of constructing a large-screen projection type display by solving the problems in the prior art and by preventing the moiré interference from occurring between the linear Fresnel lens and the lenticular lens.

In order to achieve the above object, according to this invention, the transmission type screen is formed of, at least, a first sheet through which light from a projection source is passed, a second sheet which is located on the viewer's side of the first sheet and through which the light from the first sheet is passed, and a third sheet which is located on the viewer's side of the second sheet and through which the light from the second sheet is passed. The first sheet has divergence mean for diverging light at least in the horizontal direction, and Fresnel lenses for converging light at least in the horizontal direction. The third sheet has lenticular lenses of a relatively large pitch. Also, the following relation is established among the effective divergence angle, $\epsilon$ of the divergence means, the arrangement period, $T_F$ of the Fresnel lenses, and the thickness, D of the second sheet:

$$\epsilon D/T_F \ge 0.7$$

Moreover, when the Fresnel lens is formed of the linear Fresnel lens, two half-size sheets which are formed for linear Fresnel lenses to be symmetrical like an image reflected from a mirror on the viewer's side of the sheets are joined together at the flat areas of the linear Fresnel lenses, thus constituting the first sheet.

With the above construction, the periodical shades, S of the Fresnel lenses can be reduced enough in their light and shade before the projector source's side of the third sheet (, or vignetted). Thus, the moiré interference can be reduced.

In addition, the above half-size sheets, when produced by extrusion roll molding, can be formed to be about 1.4 m in lateral width per piece. Thus, two half-size sheets, when joined together, can be formed to have about 2.8 m in width.

BRIEF DESCRIPTION OF THE DRAWINGS

FIG. 20 is a diagram useful for explaining the principle of the generation of the vertical ghost interference.

DESCRIPTION OF THE PREFERRED EMBODIMENTS

Figure 1:
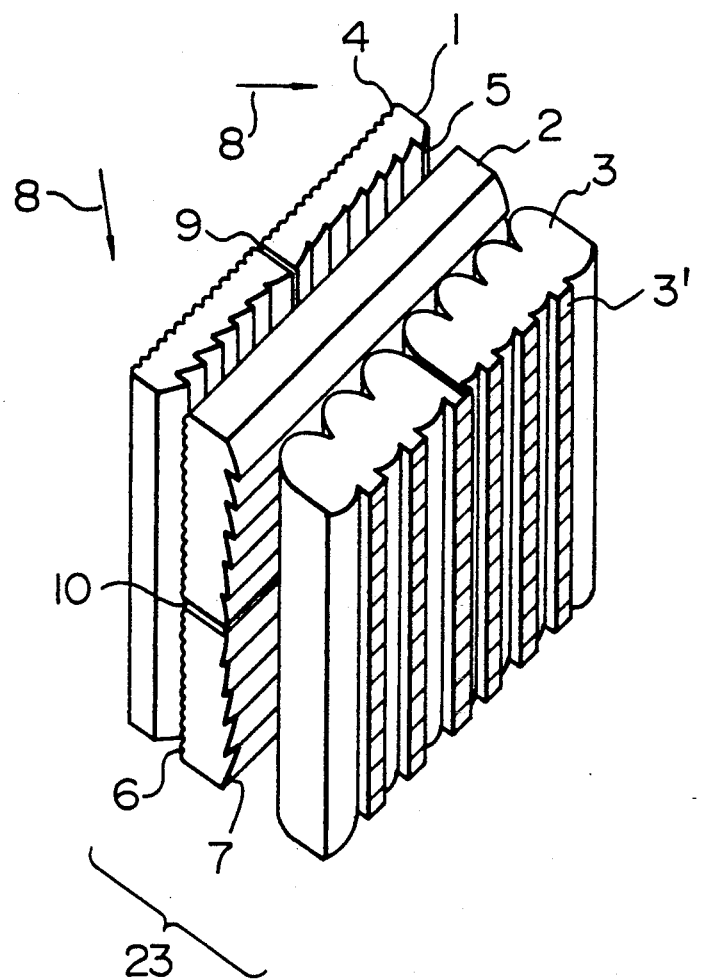
FIG. 1 is a perspective view of a screen showing one embodiment of this invention.

FIG. 1 shows one embodiment of the invention.

Referring to FIG. 1, there are shown a linear Fresnel sheet having a refractive power in the horizontal direction, a linear Fresnel sheet 2 having a refractive power in the vertical direction (hereinafter, sometimes referred to simply as the Fresnel sheet), and a lenticular sheet 3. Also, there are shown small-pitch lenticular lenses 4, 6 and Fresnel lens surfaces 5, 7.

In addition, there are shown black stripes 3' which are provided on the lenticular sheet 3, and a screen 23 which is formed of three sheets 1, 2 and 3.

The incident projection light is divergently incident to the screen as indicated by arrows 8. This divergent incident light is macroscopically paralleled in the horizontal cross-section by the action of the Fresnel lens surface 5, and further macroscopically paralleled in the vertical cross-section by the action of the Fresnel lens surface 7. Therefore, the macroscopically parallel projection light is incident to the lenticular sheet 3. The lenticular sheet 3 diverges the light left and right. The lenticular sheet 3 includes a light diffusing material (not shown) within the interior and on the surfaces by which material the light is diverged in the vertical direction.

Figure 2:
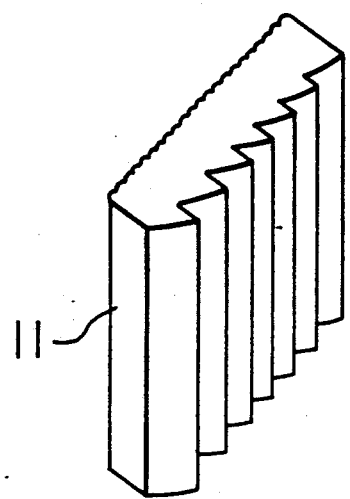
FIG. 2 is a perspective view of a half of the Fresnel sheet shown in FIG. 1.

Shown at 9 is a junction between two pieces of half-size Fresnel sheet bonded together with an adhesive, and at 10 is similarly a junction between two pieces of half-size Fresnel sheet bonded together with an adhesive. FIG. 2 shows a piece of half-size Fresnel sheet 11. The refractive action of the Fresnel lens surfaces 5, 7 is substantially zero at around the junctions 9, 10, or the junctions are flat.

Figure 3:
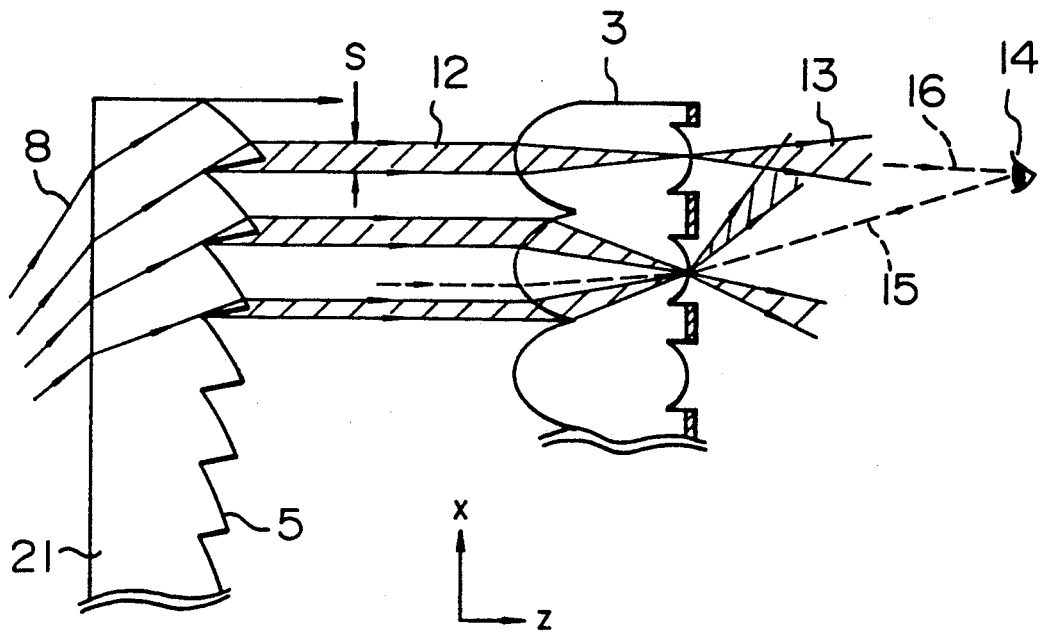
FIG. 3 is a horizontal cross-sectional view of the lenticular sheet and the Fresnel sheet without small-pitch lenticular lenses.

The small-pitch lenticular lenses 4 on the incident-surface side of the Fresnel sheet 1 act to eliminate the moiré interference. A description will be made of the reason for the occurrence of the moiré interference in the absence of this small-pitch lenticular lenses 4 with reference to FIG. 3. FIG. 3 is a horizontal cross-sectional diagram of the lenticular sheet and the Fresnel sheet without the small-pitch lenticular lenses.

In FIG. 3, there are shown a Fresnel sheet 21 with the incident surface being flat, or without the small-pitch lenticular lenses, and the lenticular lens 3 and Fresnel lens surface 5 same as in FIG. 1. The Fresnel sheet 2 is not shown in FIG. 3 since this FIG. is a horizontal cross-section. The hatched regions, 12 and 13 are shades due to the periodical structure of the Fresnel lens surface 5. Shown at 14 is an eye of the observer.

When the observer sees from the position 14, the scene in the direction, 15 looks bright since normal light comes, but the scene in the direction, 16 looks dark since no light comes due to the shade. Therefore, an interference pattern called the moiré interference appears on the screen.

The U.S. Pat. No. 4,725,134 describes that when the circular Fresnel sheet is used, the moiré pattern is analyzed to be elliptic or hyperbolic as indicated at 48 in FIG. 18 which will be mentioned later. In FIG. 3, since the linear Fresnel sheet is used, the moiré pattern is vertical stripes as illustrated at 50 in FIG. 18, and is thus more conspicuous. Thus, it is necessary to use the following principle in addition to the moiré interference reducing means described in the U.S. Pat. No. 4,725,134.

Figure 4:
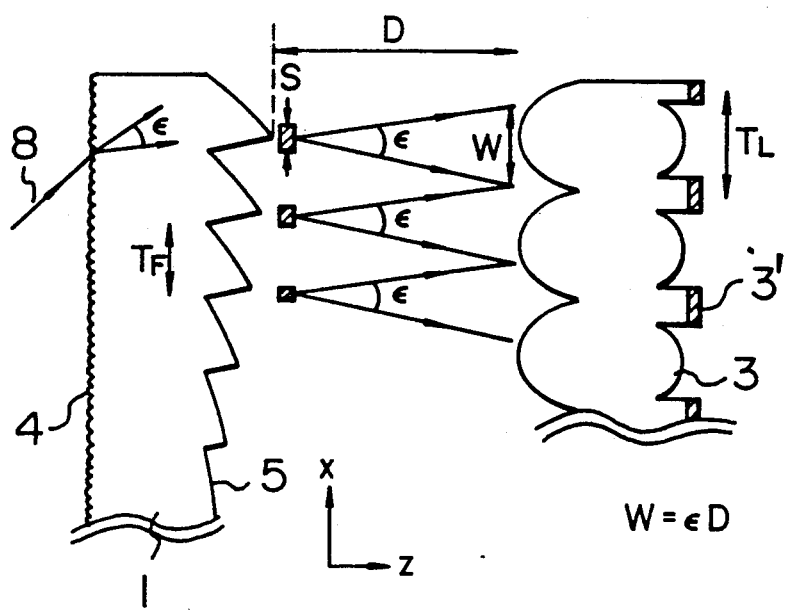
FIG. 4 is a horizontal cross-sectional view of the lenticular sheet 3 and the Fresnel sheet 1 shown in FIG. 1.

FIG. 4 is a horizontal cross-sectional diagram of the lenticular sheet 3 and the Fresnel sheet 1 shown in FIG. 1. In FIG. 4, the Fresnel sheet 2 is not shown.

In FIG. 4, the small-pitch lenticular lenses 4 diverge light over the divergence angle $\epsilon$. The value of $\epsilon$ is selected to be within a range from about 0.02 rad to about 0.2 rad. A particular value is set allowing for the conditions for the equation which will be given later.

The shades S of the Fresnel lens are diverged over the angle $\epsilon$ rad by the light diverging action of the small-pitch lenticular lenses 4 as shown in FIG. 4. In FIG. 4, D represents the thickness of the Fresnel sheet 2 shown in FIG. 1. The requirement of this embodiment is to satisfy the relation among D, $\epsilon$ and the period $T_F$ of the Fresnel lens:

$$\epsilon D/T_F \geq 0.7 \ (\epsilon D = W) \ldots \quad (1)$$

If the arrangement period of the small-pitch lenticular lenses 4 is represented by $T_1$, the radius of curvature of the lens surface by $R_1$, and the refractive index of the Fresnel sheet 1 by n, the divergence angle $\epsilon$ is expressed by the following equation:

$$\epsilon = (n-1)T_1/(nR_1) \ldots \quad (1')$$

Thus, substituting this equation for the equation (1) will yield the following equation:

$$(n-1)DT_1/(nR_1T_F) = 0.7 \ldots \quad (1'')$$

Under the condition of equation (b 1), the periodic shades of the Fresnel sheet 1 are greatly reduced in the incident surface of the Fresnel sheet 2. The shade reduction will be quantitatively expressed as follows. The pattern of the shades of the Fresnel sheet 1 at around the light-exiting surface of the Fresnel sheet 2, or at around the light-incident surface of the lenticular sheet 3 can be expressed substantially by the following equation.

$$I_1(x) \approx 1 + m_1\cos(2\pi x/T_F) \quad (2)$$
$$\approx 1 + \cos(2\pi x/T_F) \quad (2')$$
(left and right ends)

where $I_1(x)$: the luminous intensity at the horizontal distance x
$T_F$: the Fresnel period
$m_1$: the modulation degree In the above equation, $m_1$ is the modulation degree of light just after exiting from the Fresnel lens 5, and it is equal to about 1 at the left and right ends of the screen 23. $m_2$ in the equation (3) as will be mentioned later is the modulation degree of light at the incidence surface of the lenticular sheet 3.

The luminous intensity distribution $I_2(x)$ after the distance D, or at the incidence surface of the lenticular sheet 3 is determined according to the principle of Fourier transformation and under the action of the divergence angle $\epsilon$ and given by the following equation.

$$I_2(x) \approx 1 + m_2\cos(2\pi/T_F) \quad \ldots \quad (3)$$

$$m_2/m_1 = \{\sin(\pi\epsilon D/T_F)\}/(\pi\epsilon D/T_F) \quad \ldots \quad (4)$$

Figure 5:
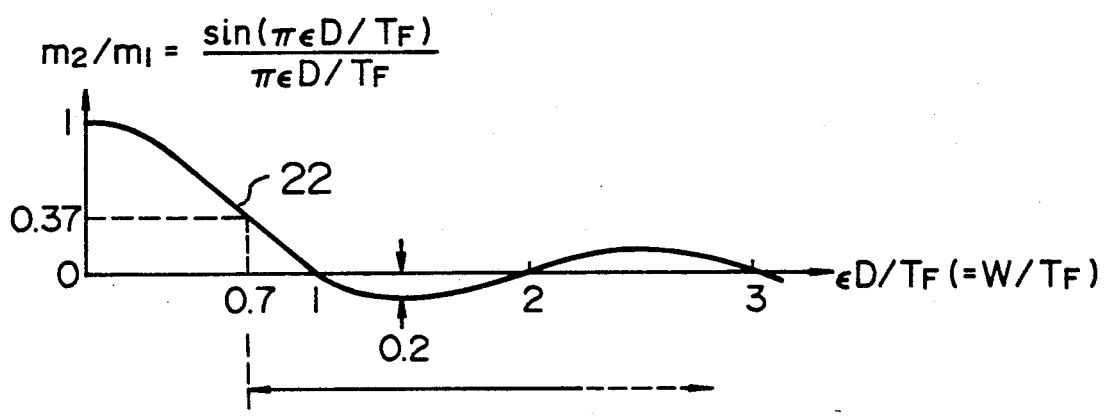
FIG. 5 is a graph showing the relation of equation 4).

The relation of equation (4) is graphically shown in FIG. 5 by a solid line 22. From the FIG., it will be see that $|m_2/m_1|$ is suddenly decreased in the region satisfying the equation (1), and that it is about 0.37 or below (corresponding to about 1 neper) in the region in which the value of equation (1) is 0.7 or above. It other words, the moiré interference intensity can be reduced to about 1/e or below by satisfying the condition of equation (1). The lower limit of the value of equation (1) is as follows. As will be obvious from FIG. 5, if only the moiré interference is simply considered, the value of equation (1) becomes more satisfactory as it increases However, in order to increase the value of equation (1), or $ED/T_F$, it is necessary to increase the divergence angle $\epsilon$ under a given condition of the upper limit of the thickness D and the lower limit of the Fresnel pitch (Fresnel period) $T_F$. When the divergence angle $\epsilon$ is increased, the light is eclipsed by the black stripes 3' shown in FIGS. 1 and 4, so that the transmission loss is increased.

Here, $1/T_F$ is regarded as a spatial frequency, $m_2/m_1$ represents the extent of the effect for vignetting (making inconspicuous) the shades of the Fresnel. If the value of the $m_2/m_1$ is 1, the vignetting effect is zero. Since the effect for making the shades of the Fresnel actually inconspicuous can be considered to be 0.37, this value can be selected as the lower limit. On the other hand, since the extent of vignetting effect becomes ideal as the value of the abscissa increases, the upper limit is absent.

A specific example of satisfying the equation (1) will be given below ($n \approx 1.5$).

$D \approx 3.5$ mm (the thickness of the Fresnel sheet 2)
$T_F \approx 0.22$ mm (the Fresnel period)
$\epsilon \approx 0.22/3.5$ rad
$\approx 0.063$ rad (the diversion angle of lenses 4)
$T_1 \approx 0.047$ mm, $R_1 \approx \{(n-1)/(n\epsilon)\} T_1 \approx 0.25$ mm The Fresnel sheets 1, 2 are made of a normal acrylic resin material of which the refractive index n is about 1.5. Thus, the value of $\epsilon$ corresponds to about 0.1 rad (about 6°) in the air. The thickness of the Fresnel sheet 1 may be arbitrary when singly used, but must be selected to be the same (3.5 mm) as that of the Fresnel sheet 2 when used with the Fresnel sheet 2.

The period of the lenticular sheet 3 is about 1.2 mm and the thickness thereof is about 1.6 mm. It is recommended that the detailed structure of the lenticular sheet 3 be the same as described in U.S. Pat. No. 4,536,056 and 4,725,134.

When the Fresnel sheet 2 is not used with the Fresnel sheet 1, it is effective that the refractive power of the Fresnel sheet 2 be set to be stronger than that of the Fresnel sheet 1. This is because, as illustrated in the perspective view of FIG. 6, the light rays from the upper and lower ends of the screen 23 can be concentrated in the direction of the viewers 14.

Moreover, it is possible to use various different modifications mentioned in the U.S. Pat. No. 4,725,134.

A method of constructing the screen will be further described in detail.

Figure 7:
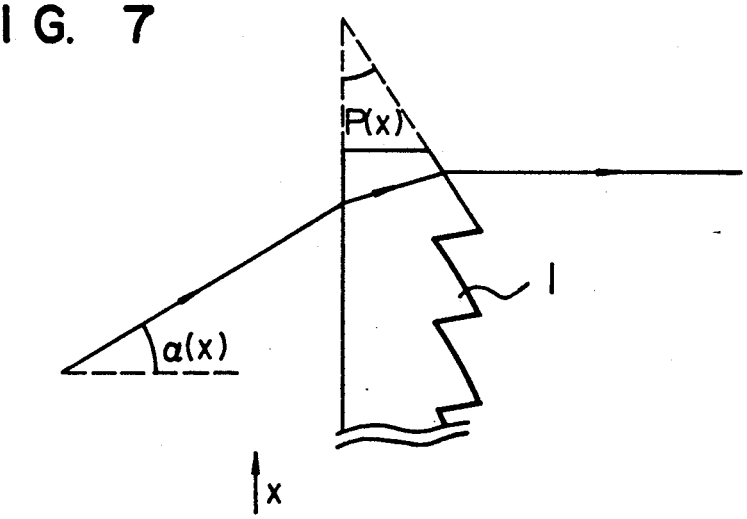
FIG. 7 is a diagram for explaining the relation between the prism angle and the incident angle of the Fresnel sheet 1 shown in FIG. 1.

FIG. 7 is a horizontal cross-sectional view of the linear Fresnel sheet 1. Referring to FIG. 7, the prism angle $P(x)$ is determined from the incident angle $\alpha(x)$ on the basis of Snell's law as follows.

$$\tan P(x) = \frac{\sin\alpha(x)}{n\sin\cos^{-1}\left(\frac{\sin\alpha(x)}{n}\right) - 1} \quad (5)$$

The prism angle $P(y)$ of the linear Fresnel sheet 2 is similarly determined as $$\tan P(y) = \frac{\sin\alpha(y)}{n\sin\cos^{-1}\left(\frac{\sin\alpha(y)}{n}\right) - 1} \quad (6)$$

When the prism angles are determined from the above formulas, the light rays exiting from the Fresnel sheet 1, 2 are parallel to each other and perpendicular to the screen surface on the center cross of the screen. However, the light rays are somewhat over-converged at the diagonal corners of the screen. This is attributed to the nonlinearity in the Snell's law.

Figure 8:
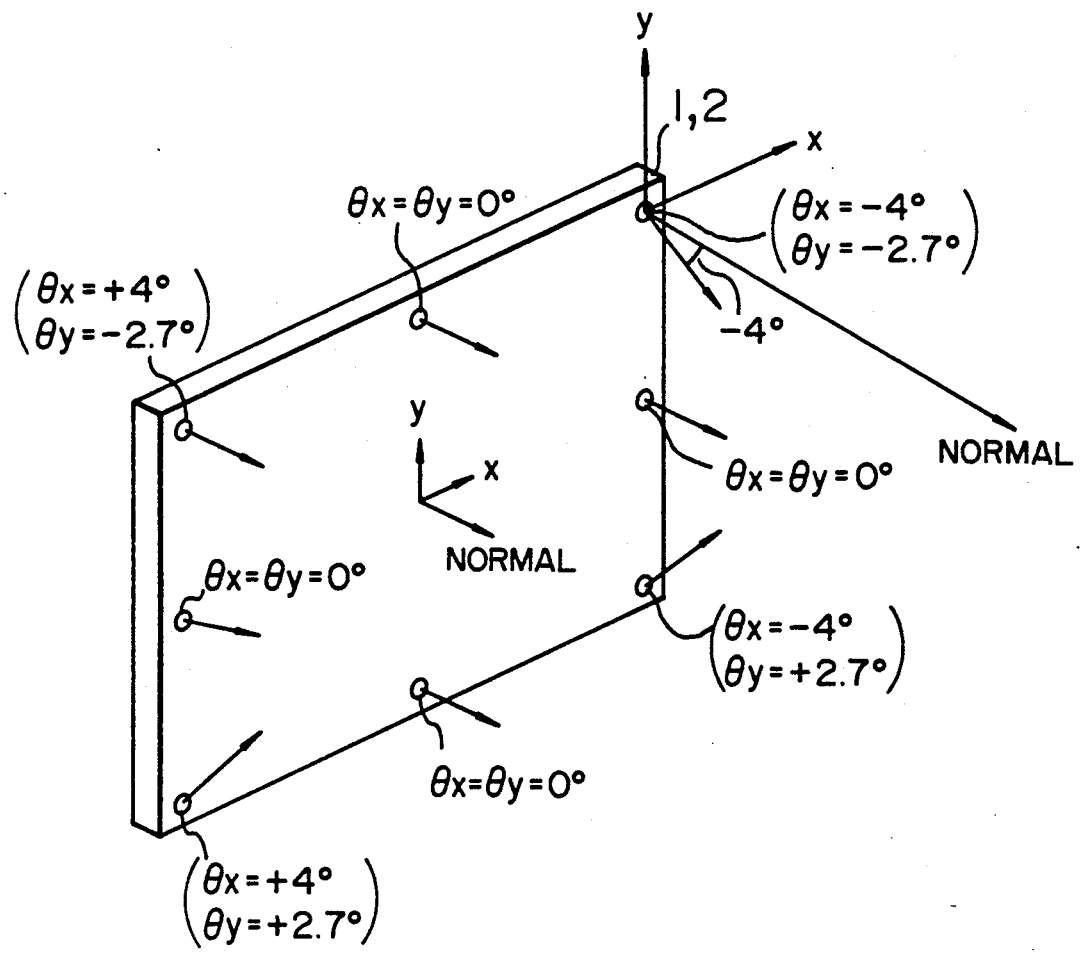
FIG. 8 is a diagram useful for explaining the angle of the exiting light from the Fresnel sheets 1, 2 shown in FIG. 1.

We now gives a specific example. The incident angle at the diagonal corners is selected to be 35° (this corresponds to the fact that the projection distance and the depth are reduced to about ⅔ those of the existing large screen), the incident angle at the left and right ends in the horizontal plane is selected to be 22.8°, and the incident angle at the upper and lower ends in the vertical plane is selected to be 20.1°. Then, the path of the light rays is calculated on the basis of Snell's law as illustrated in FIG. 8.

In other words, the light rays exiting from the center cross are perpendicular to the screen as described previously, or $\theta_x = \theta_y = 0°$, and the light rays exiting from the diagonal corners are over-converged by 4° in the horizontal direction and 2.7° in the vertical direction.

When the amount of over-convergence in the horizontal direction at the left and right ends becomes excessive, part of the exiting light rays are shut out by the black stripes 3' shown in FIG. 1. This is the problem inherent in the linear Fresnel system. This problem is alleviated as follows.

The loss of light at the diagonal corners can be avoided by somewhat reducing the arrangement period of the black stripes 3' as compared with the arrangement period of the lenticular lenses in FIG. 1. If it is done so, however, the light is attenuated at the left and right ends on the central horizontal line. In order to avoid this, the screen is required to be slightly (about 4°~10°) tilted forward as shown in FIG. 9.

Figure 9:
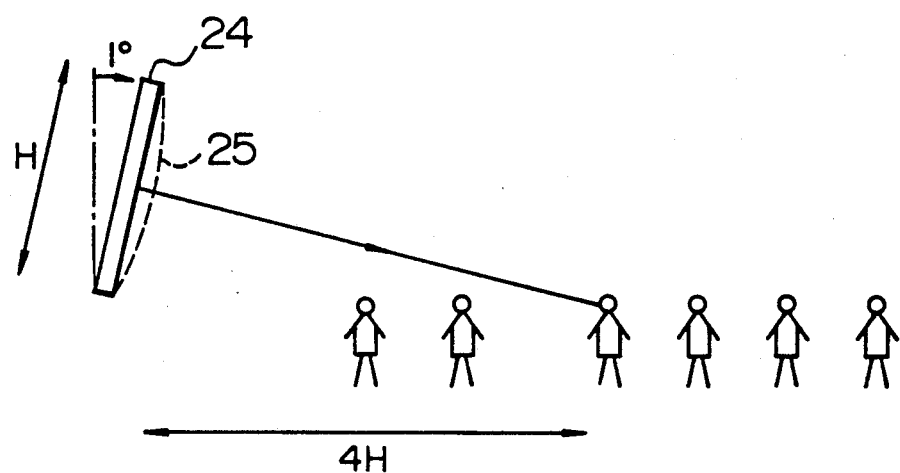
FIG. 9 is a diagram of a tilted-forward screen.

FIG. 9 shows the tilted screen. There are shown the screen frame 24 and a broken line 25 which indicates the state in which the screen is warped in the central vertical cross-section by the action of the gravity.

When the screen is tilted 7° forward, the normal to its center reaches the lower end of the screen at the visual distance of about 4 H (H is the height of screen). Since the visual distance 4 H is approximately equal to the mean visual distance of the viewers, the screen position is suitable for a large-screen display.

Figure 10:
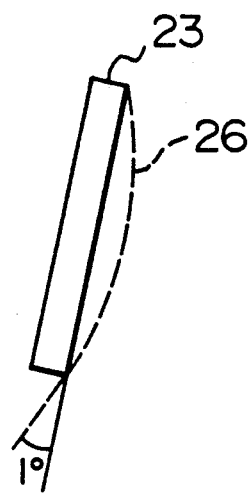
FIG. 10 is a horizontal cross-sectional diagram of the screen.

FIG. 10 is a horizontal cross-sectional view of the screen. In FIG. 10, a broken line 26 indicates the warp of the screen in the horizontal section at its center.

The invention is chiefly applied to the size of about 2.2 m in lateral width. In this case, the angle of the warp at the left and right ends is about 1°. This value acts to compensate for about 25% of the error, 4° in the convergence angles in FIG. 8.

Figure 6:
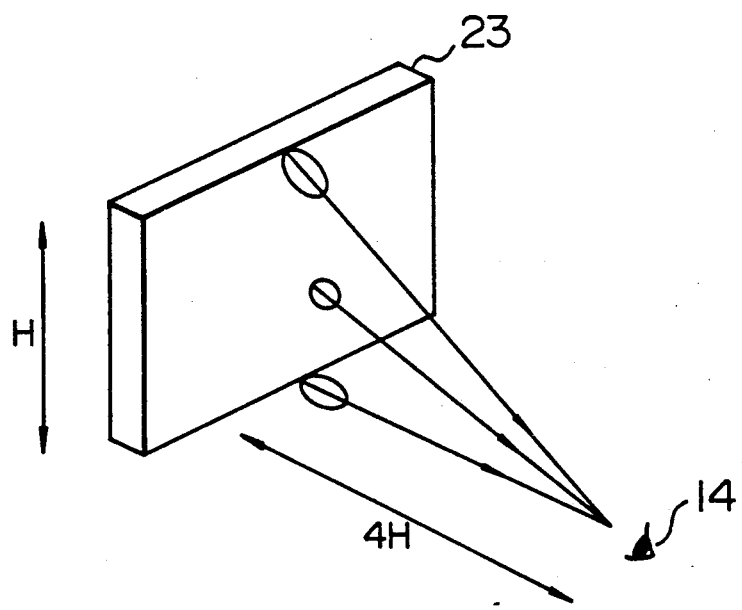
FIG. 6 is a diagram showing the effect of the refractive power of the Fresnel sheet 2 shown in FIG. 1, which is set to be stronger than that of the Fresnel sheet 1.

In the screen of about 4°~10° forward tilt shown in FIG. 9, it is also effective to increase the convergence force of the Fresnel sheet 2 as described with reference to FIG. 6. In that case, the design formula for the prism angle of the Fresnel sheet 2 is given by the following equation (6') in place of equation (6).

$$\tan P(y) = \frac{\sin\alpha(y) + \sin\gamma(y)}{n\sin\cos^{-1}\left(\frac{\sin\alpha(y)}{n}\right) - \cos\gamma(y)} \quad (6')$$

where $\gamma(y) \approx y/(4H)$ and the origin of y is the center of the screen.

Thus, by increasing the convergence force of the Fresnel sheet 2 and selecting the conjugate point to be about four times as high as the screen height H, it is possible to construct a projection type display of which the screen brightness is uniform over the upper and lower ends.

When the lenticular period $T_L$ of the lenticular sheet 3 is selected to be 1.2 mm, and the Fresnel period of the Fresnel sheet 1 to be 0.22 mm in FIG. 1 as described above, then the lenticular period $T_1$ of the small-pitch lenticular lenses 4 is selected to be bout 0.047 mm.

The $T_L/T_F$ ratio, to make the moiré pattern inconspicuous, is selected to satisfy the following equation according to U.S. Pat. No. 4,725,134:

$$T_L/T_F = N + (0.25 \sim 0.75) \ldots \quad (7)$$

where N is an integer of 3 or above

The condition for satisfying the $T_L/T_F$ ratio is given by the following equation for the general 3-CRT 3-lens system:

$$T_F/T_1 = \text{an integer} + (0.25 \sim 0.75) \ldots \quad (8)$$

As a modification, for the single-lens projection system, it is possible to make $T_1$ coincident with $T_F$ and take one-to-one correspondence between the period of the small-period lenticular lenses and the periodical structure of the Fresnel lens.

Figure 11:
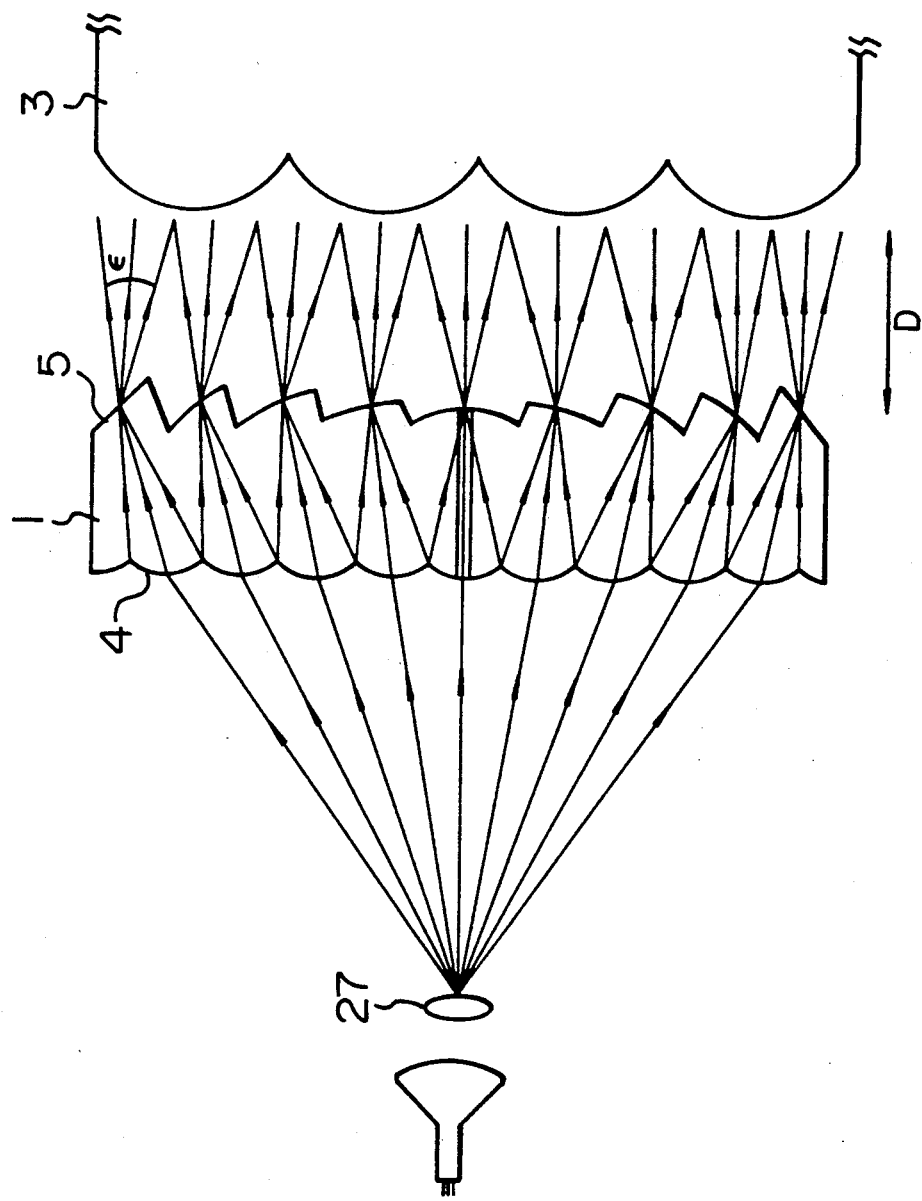
FIG. 11 is a horizontal cross-sectional diagram of one modification of this invention.

FIG. 11 is a horizontal cross-sectional view of this case. in FIG. 11, there are shown a single projection lens 27, and elements 1, 4, 5 and 3 corresponding to the Fresnel sheet 1, the small-pitch lenticular lenses 4, the Fresnel lens surface 5 and the lenticular lens 3 in FIG. 1.

The embodiment shown in FIG. 11 is different from that shown in FIG. 11 in the following point. That is, the effective sloped portions of the Fresnel lens are located at around the focal points of the small-pitch lenticular sheet 4.

Figure 12:
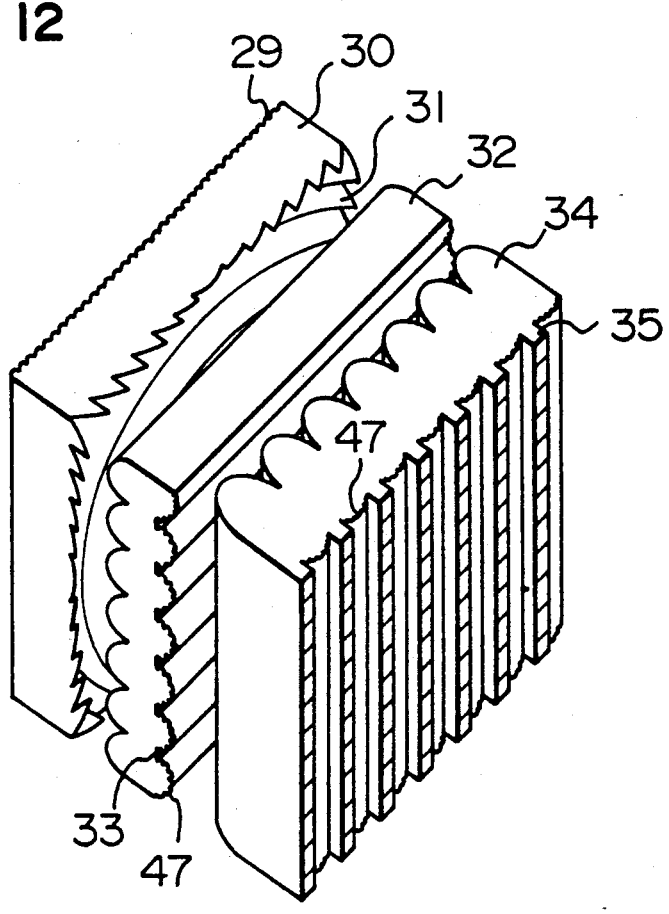
FIG. 12 is a perspective view of one application of this invention.

FIG. 12 is an embodiment which is the application of the invention to an ultra-fine pitch screen of 1.4 m in lateral width. In FIG. 12, the screen is about 80 cm wide and 80 cm high.

Shown at 29 is a small-pitch lenticular lenses for diverging light in the horizontal direction, which corresponds to the small-pitch lenticular lenses 4 in FIG. 1.

There are also shown a Fresnel sheet 30, a circular Fresnel lens 31 provided at its light-exiting surface, a lenticular sheet 32 for diverging light in the vertical direction, and so-called black stripes 33 which are a black paint provided in the troughs of the lenticular lenses. In addition, there are shown a lenticular sheet 34 which corresponds to the lenticular sheet 3, in FIG. 1, for diverging light in the horizontal direction, black stripes 35 corresponding to the black stripes 3' in FIG. 1, and a micro-lenticular lenses 47 which will be described later with reference to FIG. 17.

The pitch $T_1$ and radius of curvature R 1 of the small-pitch lenticular lenses 29, the pitch TF of the circular Fresnel lenses 31, the thickness D of the lenticular sheet 32, and the refractive index n of the medium of the lenticular sheet 32 have the relations of the equations (1) and (8):

$$DT_1/(nR_1 TF) \approx 1 \ldots \quad (1)$$

$$T_F/T_1 = \text{an integer} + (0.25 \sim 0.75) \ldots \quad (8)$$

where
$T_F = 0.1$ mm
$n = 1.5$
$D = 3$ mm
$T_1 = 0.04$ mm
$R_1 = 0.8$ mm
$\epsilon \approx T_1/(nR_1) \approx 0.08$ rad The pitch of the both-side lenticular lenses 32, 345 is 0.35 mm. This embodiment can be used for an ultra-high definition display of 2000 scan lines, 2000 horizontal dots and 4000 thousand pixels.

In this embodiment, it is recommended that the micro-lenticular lenses 47 of about 30 μm pitch described in U.S. Pat. No. 4,725,134 be provided on the light-exiting side, or lenticular lens side, of the lenticular sheets 32, 34. The synergistic action of the small-pitch lenticular lenses 4 and the micro-lenticular lenses 47 in this invention is able to eliminate the radial moiré interference indicated in FIG. 18 at 49, which will be mentioned later. In other words, this invention is able to provide a novel high-performance screen without the radial moiré interference.

Another modification of this invention will be mentioned below.

Figure 13:
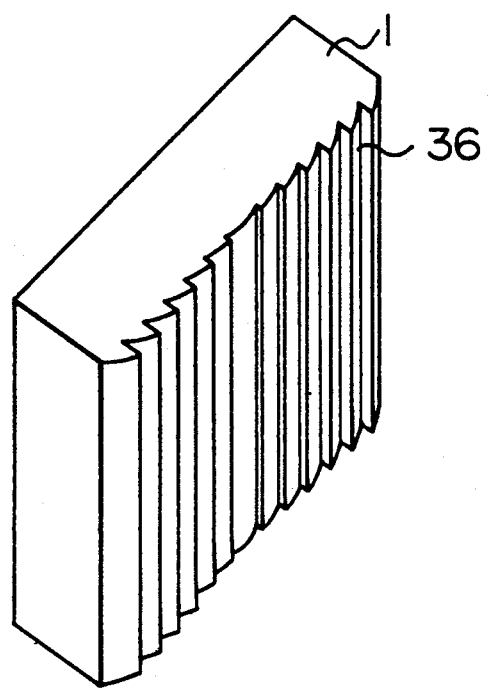
FIG. 13 is a perspective view of another modification of the invention.

FIG. 13 is a modification of the Fresnel sheet 1 shown in FIG. 1. This modification has lenticular Fresnel lenses 36 provided on its light-exiting surface. This lenticular Fresnel lenses 36 have both the action of the lenticular lenses 4 on the light-incident surface of the Fresnel sheet 1 and the action of the Fresnel lens 5 on its light-exiting surface.

Figure 14:
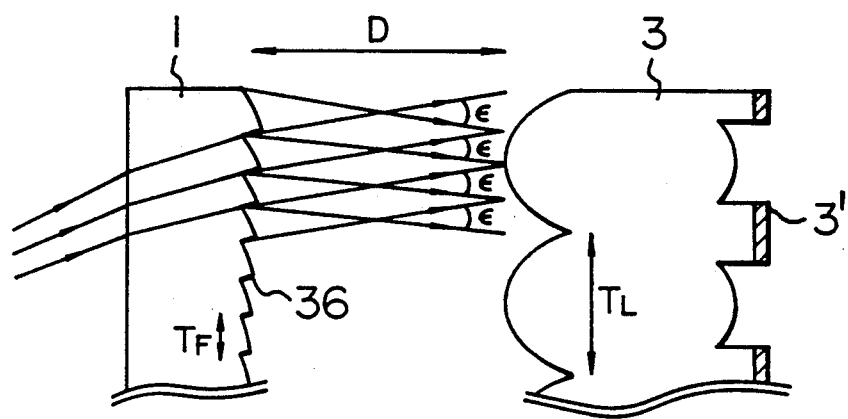
FIG. 14 is a horizontal cross-sectional diagram showing the relation between the lenticular sheet 3 of FIG. 1 and the Fresnel sheet 1 FIG. 13.

In the lenticular Fresnel lenses 36 shown in FIG. 13, the light-exiting surfaces of the fine prism elements of the normal Fresnel lenses are flat, and a curved surface is added to provide the action of the lenticular lenses. The pitch of the lenses is substantially the same as that of the small-pitch lenticular sheet shown in FIG. 1. FIG. 14 shows the principle of the operation, and this FIG. is a horizontal cross-sectional view corresponding to FIG. 4. As will be understood from the geometrical comparison between FIGS. 4 and 14, the equation (1) of the requirement for this invention can be replaced by the following equation for the lenticular Fresnel sheet shown in FIGS. 13 and 14.

$$\epsilon D/T_F \geqq 0.7 + 1 \ (\epsilon D = W + T_F) \ldots \quad (1)$$

Also, the equation (1") is replaced by the following equation since the Fresnel pitch $T_F$ coincides with the lenticular pitch $T_1$.

$$(n-1)D/(nR_1) \geq 0.7 \ldots \quad (10)$$

The specific examples of the values will be given below (D=3.5 mm, n=1.5).

The lenticular pitch of the lenticular sheet 3: $T_L = 1.2$ mm

The Fresnel pitch of the Fresnel sheet 1: $T_F = \mu m$
The radius of curvature: $R_1 = 580 \mu m$
The divergence angle: $\epsilon = 0.06$ rad $\epsilon D/T_F \approx 2$ For the convenience of the actual application of this invention, a description will be made of the meaning of divergence angle 8 of the small-pitch lenticular lenses 4 of the invention shown in FIG. 1.

Figure 15A:
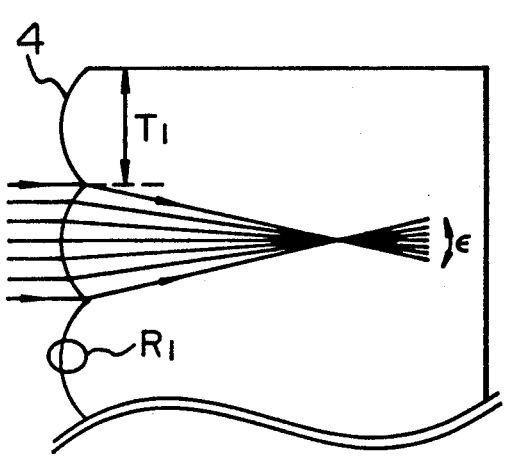
FIG. 15A and 15B are a diagram useful for explaining the meaning of the diversion angle of the small-pitch lenticular lenses 4 shown in FIG. 1.
Figure 15B:
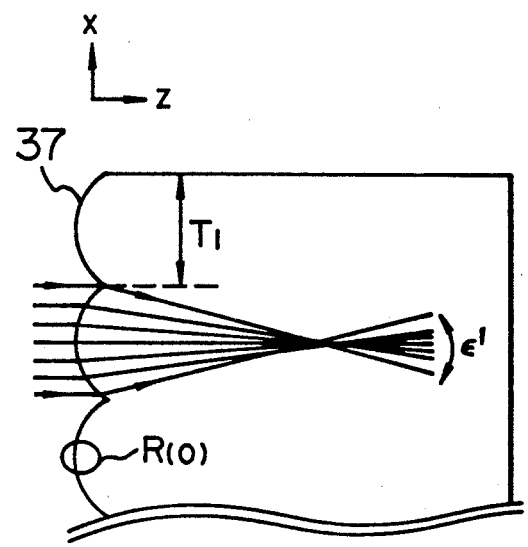

FIGS. 15A and 15B are horizontal cross-sectional diagrams of two different lenticular lenses. In FIG. 15A the cross-section of the small-pitch lenticular lenses 4 is part of the true circle of radius of curvature $R_1$. The horizontal directivity $G(\theta)$ of the lens is substantially of a rectangular shape, or substantially uniform over the divergence angle $\epsilon$ as indicated by solid line 38 in FIG. 16.

Here, $\theta$ is the horizontal refractive angle within the medium. From Snell's law, the following equation is satisfied as described previously.

$$\epsilon = (n-1)T_1/(nR_1) \ldots \quad (1)$$

where $n \approx 1.5$ (refractive index)
$T_1$: the pitch
$R_1$: the radius of curvature In general, according to Snell's law, the directivity $G(\theta)$ of the lenticular lenses is substantially proportional to the distribution of the radius of curvature $R(\theta)$ of the lenticular lenses when the refractive angle $\theta$ is much smaller than 1. In other words, following equation is satisfied:

$$G(\theta) \alpha R(\theta) \ldots \quad (11)$$

$$\therefore G(\theta)/G(\theta) = R(\theta)R(\theta) = R(\theta)/R_1 \ldots (11')$$

FIG. 15B shows small-pitch lenticular lenses 37 different from those in FIG. 15A. In FIG. 15B, the main radius of curvature of the center of each lenticular portion is equal to that in FIG. 15A, or $R_1$. However, the radius of curvature of the periphery is larger.

In other words, the curved surface of the lens shown in FIG. 15B is gentle at the center but large in curvature (small in radius of curvature) at the periphery; that is, it is longitudinally elliptic in cross-section.

Thus, the divergence angle $\epsilon'$ is larger than the $\epsilon$. The directivity of the small-pitch lenticular lenses 37 is a triangle distribution as indicated by a dotted line 40 in FIG. 16. In this FIG., a dotted line 39 indicates a different Gaussian distribution.

This invention can be applied to the lenticular lenses having there different directivity characteristics. As the requirements therefor, the effective divergence angle $\epsilon$ defined by the following equation must satisfy the equation (1).

$$\epsilon = \int G(\theta)d\theta/G(0) \quad (12)$$
$$= \int R(\theta)d\theta/R(0) \quad (13)$$

$\because$ the equation (11)
where the range of integration is $(-\pi/2, \pi/2)$.

$$\epsilon D/T_F \geq 0.7 \quad (1)$$

Figure 16:
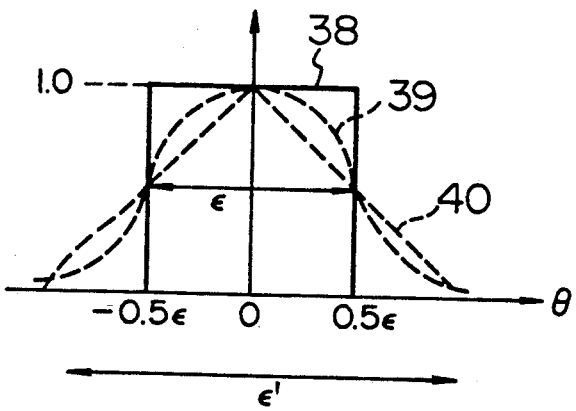
FIG. 16 is a graph showing the horizontal directivity of the small-pitch lenticular lenses shown in FIG. 15.

The equation (12) means that the areas surrounded by the lines 38 to 40 and the $\theta$-axis in FIG. 16 are equal to each other.

For example, from the theory of the Fourier transformation for the triangular distribution, the moiré attenuation ratio $m_2/m_1$ (equation (4)) is given by $$m_2/m_1 = \{\sin(\pi \epsilon D/T_F)\}/(\pi \epsilon D/\pi \epsilon T_F)]^2 \ldots \quad (4')$$

For the Gausian distribution, the following equation is given:

$$m_2/m_1 = \exp\{-\pi(\pi \epsilon D/T_F)^2\} \ldots \quad (4'')$$

The value of the equation (4') is 0.14 or below (2 neper) under the condition of equation (1). The value of equation (4") is similarly 0.22 or below ($\pi/2$ neper). Thus, these are used as the elements of the small-pitch lenticular lenses 4 of the invention.

In general, the profile shape, $z = f(x)$ of the lenticular lenses having an arbitrary directivity distribution $G(\theta)$ can be realized by the following principle. The directions of z and x are as shown in FIG. 15, and the origin is the center of the lenticular lens.

The following equation is satisfied from the definition of the radius of curvature:

$$1/R(\theta) = d^2z/(dx^2) \ldots \quad (14)$$

Also, from snell's law, the refractive angle $\theta$ within the medium is given by $$n\theta/(n-1) \approx dz/(dx) \ldots \quad (15)$$

$$\theta < 1$$

$$\therefore 1/R(\theta) = \{n/(n-1)\} \cdot \{d\theta/(dx)\} \ldots \quad (16)$$

Substituting the equation (11) for the above equation will yield $$R(\theta)/R(\theta) = G(\theta)/G(0)$$
$$= \{(n-1)/(nR0))\} \cdot \{dx/(d\theta)\} \ldots \quad (17)$$

$$x(\theta) = \frac{nR(0)}{n-1} \int_0^\theta \frac{G(\theta)}{G(0)} d\theta \quad (18)$$

The $x(\theta)$ for an arbitrary $G(\theta)$ can be graphically shown by the above equation. Since $\theta$ gives dz/dx from equation (15), or the slope angle of the lenticular lens, the lenticular shape can be obtained. For example, the lenticular profile corresponding to the triangular distribution shown in FIG. 16 at the dotted line 40 is explicitly solved as $$z = \frac{n\epsilon}{n-1} \left( |x| + \frac{n\epsilon R(0)}{3(n-1)} \left( 1 - \frac{2(n-1)|x|}{n\epsilon R(0)} \right)^{1.5} - 1 \right) \quad (19)$$

Also, substituting the equation (16) into equation (13) will yield $$\epsilon = (\int R(\theta)d)/R(0) \quad (20)$$
$$= [\int \{n-1)/n\}\{dx/(d\theta)\}d\theta]/R(0)$$
$$= [\int \{n-1)/n\}dx]/R(0)$$

$$= (n - 1)T_1/\{nR(0)\}$$

where $T_1$ is the pitch of the lenticular lenses.

The equation (20) can be used for the profile of arbitrary lenticular lenses. When $R(\theta)$ is replaced by $R_1$, the equation (20) coincides with the equation (1').

Thus, the divergence angle $\epsilon$ in the equation (1) which is the requirement for this invention is generally expressed as the effective divergence angle which is defined in the equation (12). The $R_1$ in the equations (1') and (1') is generally expressed as the main radius of curvature $R(\theta)$.

In the claims, this is referred to as the main radius of curvature $R_1$. The above generalization can be also applied directly to the lenticular lens elements of the lenticular Fresnel surface 36 in FIG. 14.

The small-pitch lenticular lens means (indicated by 4 in FIG. 1) of the invention, as will be understood from the above description on the equations (12), (4') and (4"), may have a random surface diffuser formed on the light-incident surface or light-exiting surface of the Fresnel sheet 1 or on the light-incident surface of the Fresnel sheet so that the requirement for the equation (1) is satisfied by the effective divergence angle (equation (12), $\epsilon$ in FIG. 16) $\epsilon$.

Moreover, small particles of which the refractive index is slightly different from the medium may be mixed within the Fresnel sheet 1 so as to obtain the bulk diffuser, thereby causing the effective divergence angle $\epsilon$ to satisfy the equation (1).

Figure 17:
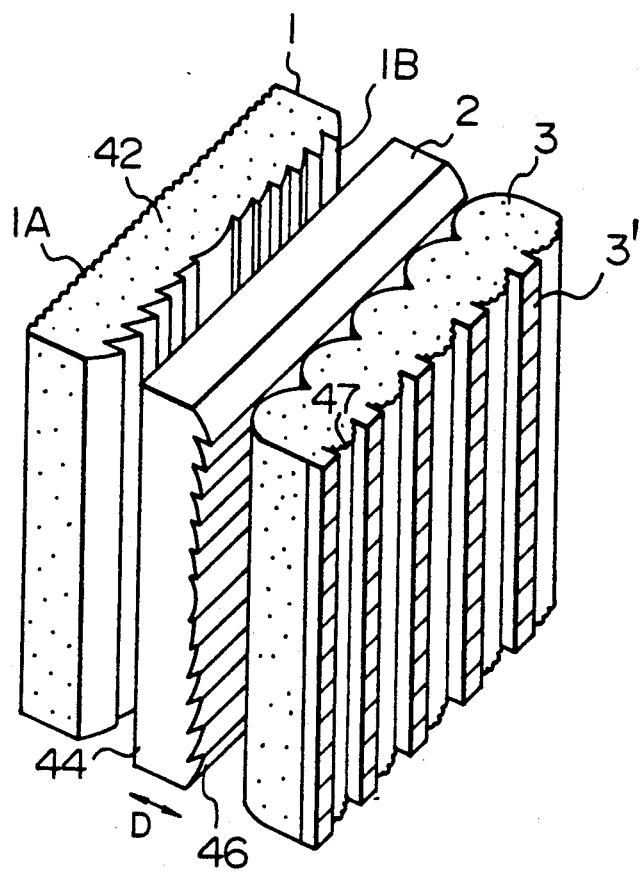
FIG. 17 is a perspective view of still another modification of the invention.

FIG. 17 shows this example. In this FIG., elements 1, 2, 3 and 3' correspond to those 1, 2, 3, 3' in FIG. 1. 1A represents the light-incident surface of the linear Fresnel sheet 1, and 1B is the light-exiting surface thereof. The surfaces 1A, 1B and 44 are suited to form the surface diffuser. Shown at 42 is the bulk diffuser within the Fresnel sheet 1.

The requirement for the structure of the invention shown in FIG. 17 is that the following relation between the effective width W of the shades of the light-exiting portions of the Fresnel lens on the Fresnel lens surface 1B and the period $T_F$ of the Fresnel periodical structure of the Fresnel lens 1 is satisfied at the light-exiting surface of the linear Fresnel sheet 2.

$$W/T_F \geq 0.7 \ldots \quad (21)$$

If this relation is expressed by use of the total effective divergence angle $\epsilon$ o the surface diffusers of the surface 1A, 1B, 44, the bulk diffuser and the small-pitch lenses on the surface 1A in FIG. 17, the equation (1) can be obtained $$\epsilon D/T_F 0.7 \ldots \quad (1)$$

As described above, in order to prevent the eclipse loss of light by the black stripes 3' it is desired that the ratio $\epsilon/\epsilon'$ in FIG. 16 be small.

In FIG. 17, there is also shown a lenticular Fresnel lens surface 46 similar to that in FIG. 14. The Fresnel component thereof is constructed on the basis of the equation (6') and has the characteristic shown in FIG. 6. The lenticular component of the lenticular Fresnel surface 46 is constructed on the basis of the equations (18) and (19). The effective divergence angle thereof is set to be as large as about 0.2~0.4 rad. Thus, the amount of the bulk diffuser mixed within the lenticular sheet 3 can be reduced, so that the transmission efficiency of light can be improved.

In FIG. 17, there also also shown microlenticular lenses 47 disclosed in U.S. Pat. No. 4,725,134.

The arrangement period of the micro-lenticular lenses 47 is selected, according to this Gazette, to be smaller than the effective diameter of the image of the iris of the projection lens at the light-exiting surface of the lenticular sheet 3. The effective divergence angle of the micro-lenticular lenses 47 is selected to be larger than the arrangement period $T_F$ of the Fresnel lens of the Fresnel surface 5. According to this structure, it is possible to eliminate the longitudinal stripe-shaped moiré interference which is caused particularly in the linear Fresnel lens as indicated by 50 in FIG. 18C.

Figure 18A:
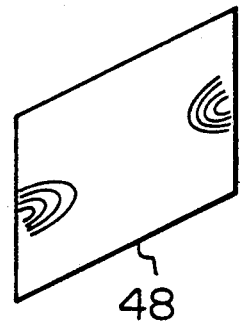
FIGS. 18A, 18B, and 18C are perspective views showing various different kinds of moiré interference.
Figure 18B:
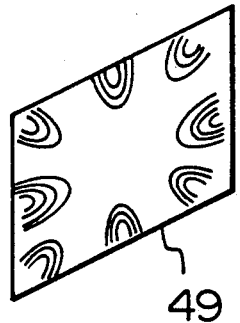
Figure 18C:
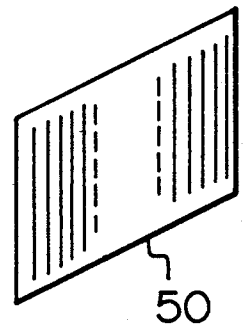

FIG. 18A shows the moiré interference between the circular fresnel lens 30 and lenticular sheet 34 in FIG. 12, and FIG. 18B shows the moiré interference between the three sheets 30, 32, 34 in FIG. 12.

Figure 19:
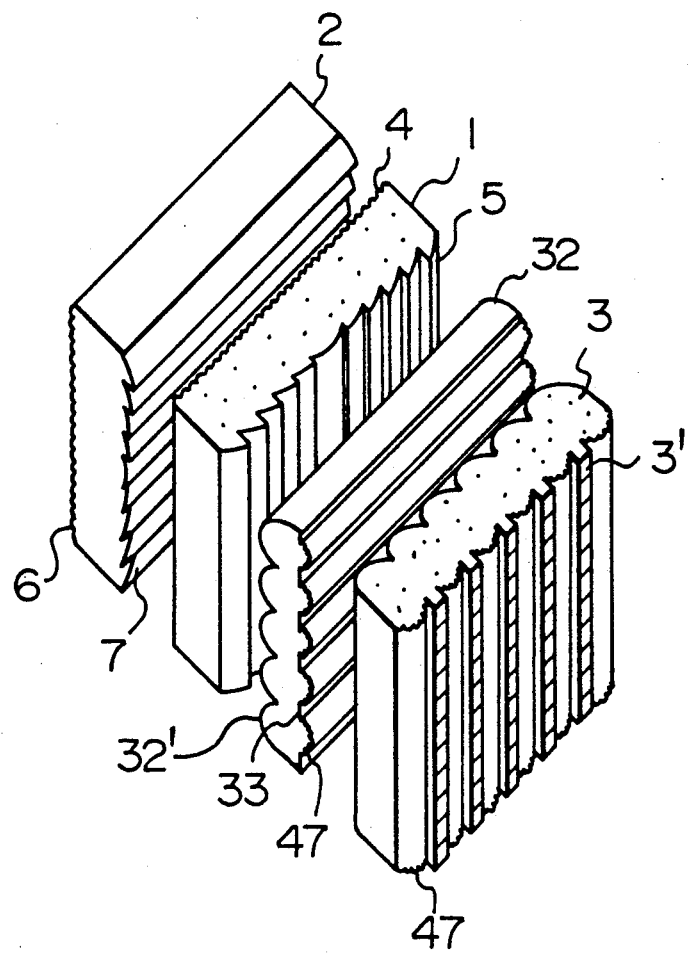
FIG. 19 is a perspective view of further modification of the invention.

FIG. 19 shows still another modification. In this FIG., elements 1, 2, 3, 3', 4, 5, 6, 7 are the same as those in FIG. 1. The sheets 32, 33 are the same as those in FIG. 12. The micro-lenticular lenses 47 are the same as those in FIGS. 2 and 17. Shown at 32' is the light-incident surface of the sheet 32. These four sheets in FIG. 19 are all produced by high-precision extrusion molding.

The effects peculiar to this structure which are not present in the embodiments mentioned previously will be given below.

(1) The vertical divergence small-pitch lenticular lenses 6 act to eliminate the lateral-line-shaped moiré interference between both the lenticular lenses of the lenticular sheet 32 and the vertical convergence linear Fresnel lens 7. The requirement therefor is the same as the equation (1).

(2) The black stripes 33 provided in the troughs act to eliminate the vertical ghost interference peculiar to the vertical convergence linear Fresnel lenses by the following principle.

FIG. 20 shows the principle on which the vertical ghost interference is caused.

This FIG. is a vertical cross-sectional view of the Fresnel sheet 2 at around the top. The moiré interference reducing small-pitch lenticular lenses 6 on the light-incident surface of the Fresnel sheet 2 are not shown for the convenience of explanation of ghost principle. Shown at 54 is input light from a projection source, and 55 is output light, or part of the input light which exits from the Fresnel lens surface 7.

The broken arrows indicate the light reflected from the Fresnel lens surface 7. This light ray exits from the Fresnel lens surface at an angle g as ghost interference li9ht 56. The distance between the primary output light and the ghost interference light is about twice as large as the thickness of the Fresnel sheet 2. This inventor found, from the detailed light path analysis and experimental result, that the main energy of the ghost interference light is present in the region of about 45° or above in the direction angle.

Figure 21:
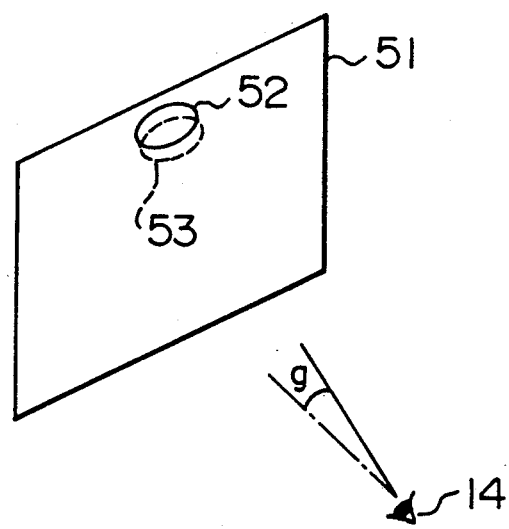
FIG. 21 is a diagram useful for explaining the ghost on the screen.

FIG. 21 shows the ghost interference on the screen. In FIG. 21, there are shown a screen 51, an eye 14 of the observer, and the original image 52 of a ring shape. Also, the ghost interference is indicated by a broken line 53. This ghost interference appears inside the original image when the observer looks up the screen at an angle.

Figure 22:
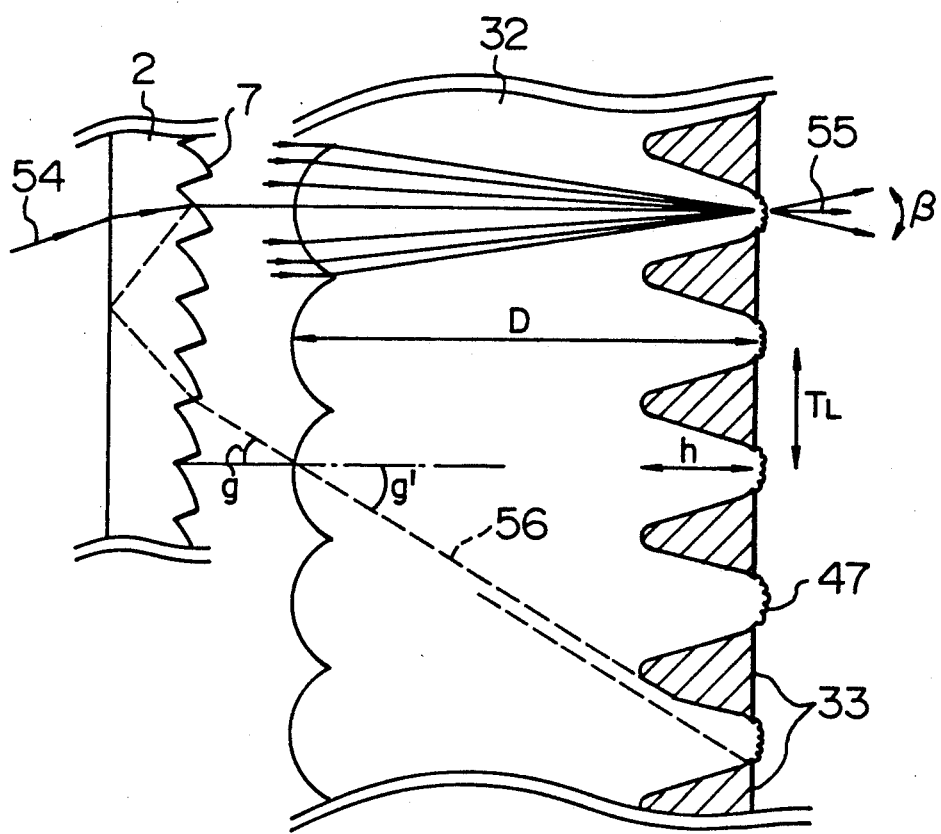
FIG. 22 is a horizontal cross-sectional view showing the relation between the vertical-diversion both-side lenticular sheet 32 of FIG. 19 and the Fresnel sheet 2.

FIG. 22 is a horizontal cross-sectional view of the Fresnel sheet 2 and vertical divergence both-side lenticular lens 32 shown in FIG. 19. This FIG. shows the principle for eliminating the ghost interference.

In FIG. 22, there are shown input light 54 from a projection source, the proper output light 55 and ghost interference light 56 indicated by the broken line. The ghost interference light is suppressed by the black stripes 33.

In order to suppress the components of the main energy direction angle g > 45° (about 0.78 rad) or g·45° of the ghost interference in FIG. 20, it is necessary to satisfy the following condition based on the geometrical principle.

$$2h/T_L \geq g' \geq g/n \geq 0.5 \ldots \quad (22)$$

where h is the depth of the troughs of the black stripes, $T_L$ is the arrangement pitch of the lenticular lenses, g' is the refractive angle within the medium (rad), g is the direction of the ghost (rad), and n is the refractive index.

In FIG. 22, the relation among the effective divergence angle $\beta$ and thickness D of the lenticular sheet 32, the lenticular pitch $T_L$, and the main radius of curvature R(0) Of the lenticular lens is given by $$T_L/D \approx \beta/n \approx \beta/1.5 \ldots \quad (23)$$

$$R(0) = \{(n-1)/n\}D \approx D/3 \ldots \quad (23')$$

Thus, when the effective divergence angle $\beta$ is about 0.34 rad (20°), the thickness D is about 4.4 times the pitch.

In order to satisfy the ghost elimination condition of equation (22), the depth h of the troughs of the black stripes of the lenticular lenses is required to be about 25% of the pitch $T_L$.

In practice, if the energy of the ghost interference is substantially halved the effect is great on the screen. Thus, the black stripes 33 are formed to be halved or to more reduce the transmissibility of the lenticular sheet 32 to the incident light at an angle of 45°. This is a necessary condition for this structure, while the equation (22) is a sufficient condition.

Only necessary parts are shown in FIG. 22 for simply explaining the micro-lenticular lenses 47 for reducing the moiré interference shown in FIG. 20.

Figure 23:
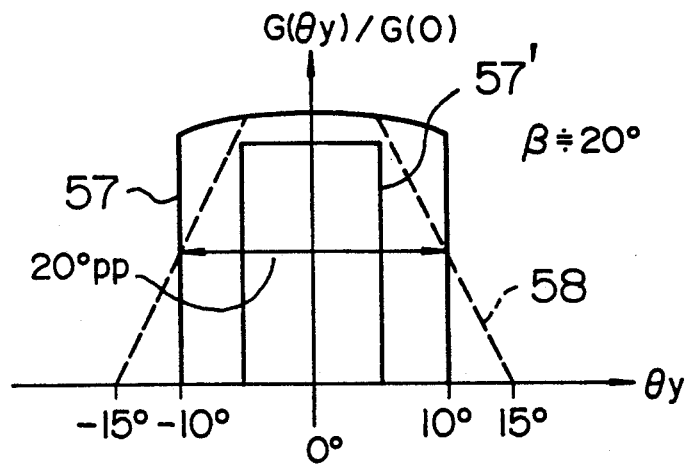
FIG. 23 is a graph showing the vertical directivity of the micro-lenticular lenses of FIG. 19 in comparison with the absence of these lenses.

The micro-lenticular lenses for reducing the moiré interference have not only the action for reducing the moiré interference but also the action for improving the vertical directivity as shown in FIG. 23.

In FIG. 23, a rectangular-shaped uniform distribution 57 indicates the vertical directivity characteristic of lens 32' provided on the light-incident side of the sheet 32 in FIG. 19. The divergence angle is about 20 degrees. A rectangular-shaped distribution 57' indicates the vertical directivity characteristic of the micro-lenticular lenses 47 of which the divergence angle is about 10 degrees. A trapezoidal distribution 58 indicates the total vertical directivity characteristic of the combination of the characteristics 57 and 57'. The principle of the combination is the convolution integration. From this FIG., it will be seen that the sharp cutoff characteristic (rectangular shape) is changed to the remote cutoff characteristic (trapezoidal shape) by the action of the microlenticular lenses 47. Thus, a more natural image without no feeling of physical disorder can be obtained.

The description for the vertical direction ends.

In FIG. 19, for the horizontal direction, the divergence angle of both-side lenticular lens sheet 3 is set to be as large as about 80° pp or above. Thus, the ghost interference can also be eliminated by forming the black stripes 3' to be convex as illustrated.

The micro-lenticular lenses 47 on the light-exiting surface of the lenticular sheet 3 are effective not only for reducing the moiré interference, but also for improving the color shift and color purity.

Figure 24:
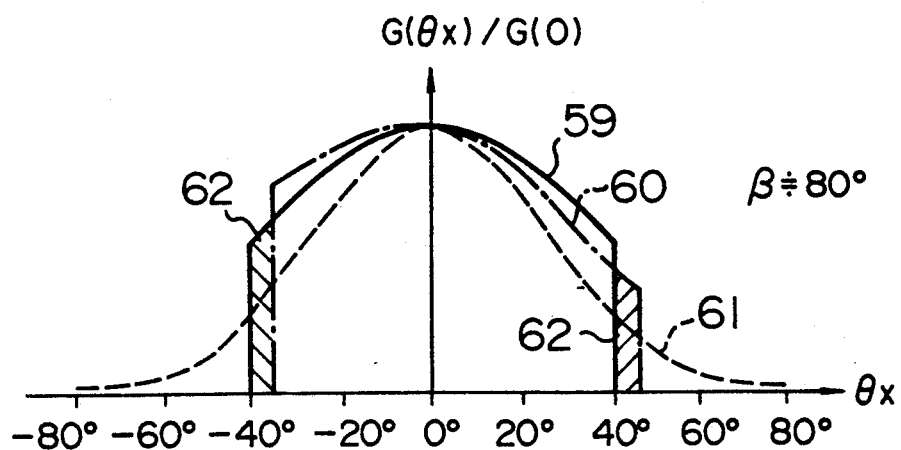
FIG. 24 is a graph showing the horizontal directivity of the micro-lenticular lenses of FIG. 19 in comparison with the absence of these lenses.

In FIG. 24, a solid line 59, a one-dot chain line 60 and a broken line 61 indicate the horizontal directivity characteristics of the lenticular sheet. The characteristics 59, 60 correspond to green light and red light in the absence of the micro-lenticular lenses. In FIG. 24, a shaded area 62 generates a color shift interference on the screen because only one side light is present. The characteristic 61 is able to reduce the disagreement between the directivity characteristics of green light and red light (also blue light though not shown) because the micro-lenticular lenses are present. Thus, the picture quality is improved.

The remote cutoff of the directivity and the ghost interference reducing effect can be achieved by the structure of FIG. 12 as in FIG. 19.

According to this invention, a large-screen projection-type display can be realized which was difficult in its practical use in the prior art.

In addition, in the prior art the large circular Fresnel sheet was difficult to produce, but according to the invention it can be easily produced by the half-size width extrusion roll molding process.

Moreover, the vertical stripe-shaped moiré interference can be reduced to about 1/5 or below by the mutual interference of periodical structure between the linear Fresnel lens and the lenticular lens. Thus, high-quality pictures can be obtained.

It is also possible to reduce the transmission loss of light due to the nonlinear over-convergence at the diagonal corners which is peculiar to the linear Fresnel lens.

In addition, the small-pitch lenticular lenses of the invention are also effective to reduce the moiré interference of the ultra-high definition projection type display.

Figure 25:
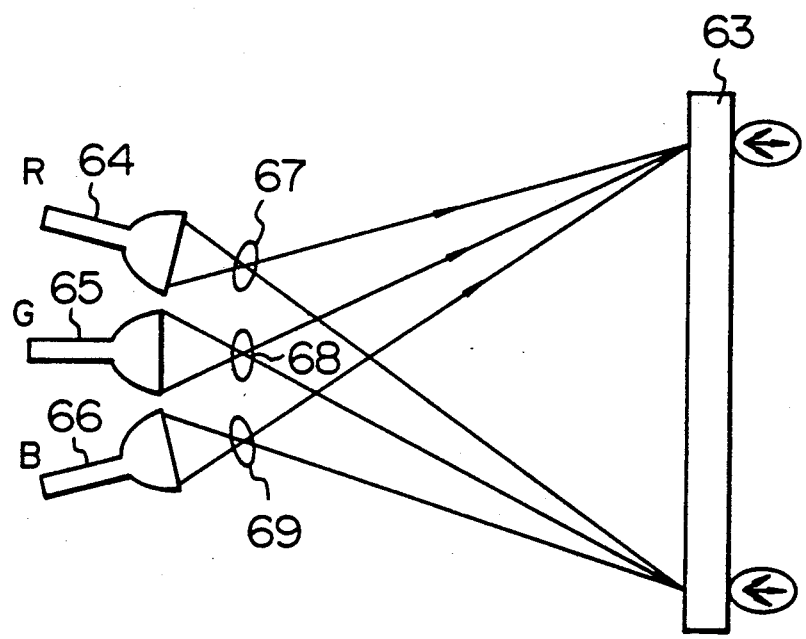
FIG. 25 is a diagram showing the arrangement of projection sources.

FIG. 25 shows the arrangement of projection sources for reference. This FIG. is a horizontal cross-sectional view of the display. There are shown the screen 63 in FIG. 19, CRTs or liquid panels 64, 65, 66 for R (red), G (green) and B (blue) projection sources, and projection lenses 67, 68, 69.

Since the light rays from the projection sources R, G, B are incident to the screen at different angles, the directivity difference occurs as shown in FIG. 24 at 59 and 60. However, this directivity difference can be reduced by the structure of FIG. 19. The structure of FIG. 20 is effective for the remote cutoff of the directivity even in the application to one set of projection sources and projection lenses 64 to 69 in FIG. 25.

What is claimed is:

1. A large-screen projection-type display using a transmission type screen, said transmission type screen comprising at least:
   a first sheet transparent to light from a projection source;
   a second sheet which is provided on the viewer's side of said first sheet and which is transparent to light from said first sheet; and a third sheet which is located on the viewer's side of said second sheet and which is transparent to light from said second sheet, said first sheet having first divergence means for diverging light at least in the horizontal direction and Fresnel lenses for converging light at least in the horizontal direction, said third sheet having first lenticular lenses of a relatively large pitch, an effective divergence angle $\epsilon$ of said first divergence means, an arrangement period $T_F$ of said Fresnel lens, and a thickness D of said second sheet have a relation given by $$\epsilon D/T_F \geq 0.7$$

2. A large-screen projection-type display according to claim 1, wherein said first divergence means is formed of second lenticular lenses of a relatively small pitch, and is formed on the projection source side surface of said first sheet, and said Fresnel lenses are formed on the viewer's side surface of said first sheet.

3. A large-screen projection-type display according to claim 1, wherein said Fresnel lenses are formed of linear Fresnel lenses.

4. A large-screen projection-type display according to claim 3, wherein said first sheet is constructed by joining together, at a flat portion of said linear Fresnel lenses, two half-size sheets which are produced so that said linear Fresnel lenses on the viewer's side surface can be formed symmetrical like an image reflected from a mirror.

5. A large-screen projection-type display according to claim 1, wherein said second sheet has convergence means for converging light in the vertical direction.

6. A large-screen projection-type display according to claim 1, wherein said second sheet has second divergence mean for diverging light in the vertical direction.

7. A large-screen projection-type display according to claim 5, wherein said transmission type screen has a stronger converging force in the vertical direction than in the horizontal direction.

8. A large-screen projection-type display using a transmission type screen, said transmission type screen comprising at least:
   a first sheet transparent to light from a projection source;
   a second sheet which is provided on the viewer's side of said first sheet and which is transparent to light from said first sheet; and a third sheet which is located on the viewer's side of said second sheet and which is transparent to light from said second sheet, said first sheet having first lenticular Fresnel lenses for diverging light at least in the horizontal direction and converging light at least in the horizontal direction, said third sheet having third lenticular lenses of a relatively large pitch, an effective divergence angle $\epsilon$ of a lenticular component of said first lenticular Fresnel lenses, an arrangement period $T_F$ of Fresnel components of said first lenticular Fresnel lenses, and a thickness D of said second sheet have a relation given by $$\epsilon D/T_F \geq 0.7$$

9. A large-screen projection-type display according to claim 3 or 4, wherein said transmission screen is tilted toward the observer by 4°~10° to the vertical direction.

10. A large-screen projection-type display according to claim 6, wherein said second divergence means is formed of second lenticular Fresnel lenses and is formed on the viewer's side surface of said second sheet.

11. A large-screen projection-type display according to claim 6, wherein said second divergence means is formed of fourth lenticular lenses and formed on the projection source side and viewer's side surfaces of said second sheet, said fourth lenticular lenses formed on the viewer's side surface of said second sheet have first black stripes formed on the light-non-transmitting portion and first micro-lenticular lenses formed on the lens surfaces, said first micro-lenticular lenses have the arrangement period selected to be smaller than the effective diameter of a projection source image on the viewer's side surface, and the effective divergence angle per arrangement period $T_F$ of said Fresnel lenses selected to be larger than that of said fourth lenticular lenses formed on the projection source side and viewer's side surfaces of said second sheet.

12. A large-screen projection-type display according to claim 1, wherein said first lenticular lenses are formed on the projection source side and viewer's side surfaces of said third sheet, said first lenticular lenses formed on the viewer's side surface of said third sheet have second black stripes formed on the light-non-transmitting portion and second microlenticular lenses formed on the lens surfaces, said second micro-lenticular lenses have the arrangement period selected to be smaller than the effective diameter of a projection source image on the viewer's side surface and the effective divergence angle per arrangement period $T_F$ of said Fresnel lenses selected to be larger than that of said first lenticular lenses formed on the projection source side and viewer's side surfaces of said third sheet.

13. A large-screen projection-type display according to claim 11, wherein said first black stripes are formed in the troughs of said fourth lenticular lenses that are formed on the viewer's side surface of said second sheet so that light incident to the projection source side surface of said second sheet at an angle of ±45° to the normal to said projection source side surface is reduced to ½ or below in its intensity when said incident light is passed therethrough.

14. A large-screen projection-type display comprising:
   divergence means for diverging light at least in the horizontal direction;
   Fresnel lens means for converging light at least in the horizontal direction;
   means for forming a thickness; and
   horizontal lenticular lens means for diverging light in the horizontal direction,
   wherein said divergence means and said Fresnel lens means are located on the light-incident side of said thickness-forming means, said thickness-forming means is located on the light-incident side of said horizontal lenticular lens means, and an effective divergence angle $\epsilon$ of said divergence means, an arrangement period $T_F$ of a Fresnel lenses of said Fresnel lens means, and a thickness D of said thickness-forming means have the following relation:

$$\epsilon D/T_F \geq 0.7$$

15. A large-screen projection-type display according to claim 14, wherein said Fresnel lens means is formed on the light-exiting surface of a first Fresnel sheet, and said divergence means is small-pitch lenticular lens means which diverges light in the horizontal direction, and formed on the light-incident surface of said first Fresnel sheet means.

16. A large-screen projection-type display according to claim 14, wherein said Fresnel lens means is linear Fresnel lens means.

17. A large-screen projection-type display according to claim 14, wherein said Fresnel lens means is circular Fresnel lens means.

18. A large-screen projection-type display according to claim 16, wherein said linear Fresnel lenses means is constructed by joining together, at a flat portion of said linear Fresnel lens, two half-size sheets which are constructed to be symmetrical like an image reflected from a mirror.

19. A large-screen projection-type display according to claim 16, wherein said linear Fresnel lens means is constructed by joining together, at a flat portion of said linear Fresnel lenses, two half-size sheets which are constructed to be symmetrical like an image reflected from a mirror.

20. A large-screen projection-type display according to claim 14, wherein said thickness-forming means includes means for converging light in the vertical direction.

21. A large-screen projection-type display according to claim 14, wherein said thickness-forming means includes means for diverging light in the vertical direction.

22. A large-screen projection-type display according to claim 20, wherein the vertical converging force of said transmission type screen is stronger than the horizontal converging force.

23. Large-screen projection-type display according to claim 14, wherein said Fresnel lens means is lenticular Fresnel lens means, said divergence means is a lenticular component constituting said lenticular Fresnel lens means, and an effective divergence angle $\epsilon$ of said lenticular component satisfies the following equation:

$$\epsilon D/T_F \geq 0.7$$

24. A large-screen projection-type display according to claim 16, wherein said transmission type screen is tilted forward by about 4–10 degrees.

25. A large-screen projection-type display according to claim 18, wherein said transmission type screen is tilted forward by about 4~10 degrees.

26. A large-screen projection-type display according to claim 19, wherein said transmission type screen is tilted forward by about 4~10 degrees.

27. A large-screen projection-type display according to claim 21, wherein said thickness-forming means has a lenticular lens surface formed on the light-exiting surface.

28. A large-screen projection-type display according to claim 21, wherein said thickness-forming means is both-side lenticular lens means for diverging light in the vertical direction, said light-exiting side lenticular lenses have black stripes formed on the light-non-transmitting portion, and said light-exiting side lenticular lens surface has micro-lenticular lenses of which the arrangement period is selected to be smaller than the effective diameter of a projection source image on said light-exiting surface and of which effective divergence angle is selected to be larger than that of said both-side lenticular lens per arrangement period $T_F$ of said Fresnel lenses.

29. A large-screen projection-type display according to claim 14, wherein said large-pitch lenticular lens means is both-side lenticular lens means, said light-exiting side lenticular lenses have black stripes formed on the light-non-transmitting portion, and said light-exiting side lenticular lens surface has microlenticular lenses of which the arrangement period is selected to be smaller than the effective diameter of a projection source image on said light-exiting surface and of which effective divergence angle is selected to be larger than that of said both-side lenticular lens per arrangement period $T_y$ of said Fresnel lenses.

30. A large-screen projection-type display according to claim 28, wherein said black stripes are formed in the troughs of said lenticular lenses and sloped at an angle of about ±45 degrees to the normal to the screen so as to reduce light incident to said both-side lenticular lens means to about 0.5 or below in the intensity when said light is transmitted therethrough.

* * * * *